Feb. 9, 1960  J. B. WREN ET AL  2,924,729
LINT-FREE FAN-COOLED DYNAMOELECTRIC MACHINE
Filed April 29, 1957  3 Sheets-Sheet 1

WITNESSES

INVENTORS
John B. Wren &
James H. Penney
BY
ATTORNEY

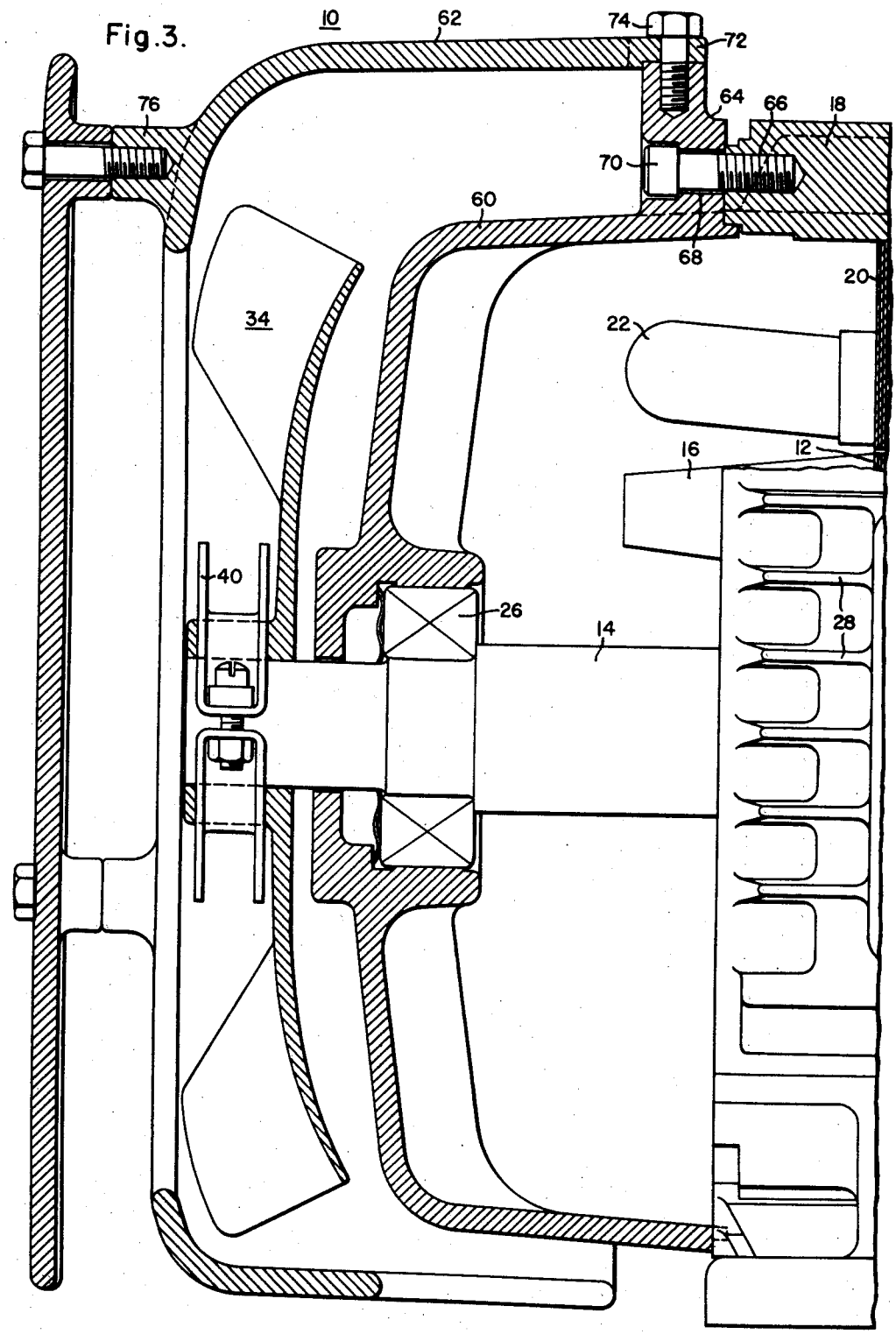

United States Patent Office 2,924,729
Patented Feb. 9, 1960

2,924,729

LINT-FREE FAN-COOLED DYNAMOELECTRIC MACHINE

John B. Wren and James H. Penney, Amherst Township, Erie County, N.Y., assignors to Westinghouse Electric Corporation, East Pittsburgh, Pa., a corporation of Pennsylvania Application April 29, 1957, Serial No. 655,589

3 Claims. (Cl. 310—56)

The present invention relates to improvements in dynamoelectric machines and more particularly to an improved ventilation system for such machines, especially dynamoelectric machines of the totally enclosed type.

In the design of dynamoelectric machines of the totally enclosed type, it is customary to provide an external fan for circulation of external air over the heat transfer surface of the machine. A major difficulty in applying totally enclosed machines is encountered in applications where the atmosphere is heavily laden with lint or other foreign particles which tend to close or partially close narrow air passages. This condition is particularly troublesome in textile factories.

There is a demand for totally enclosed motors in the textile industry where motors are required to be operated in lint-laden atmospheres. If allowed to work its way into electric equipment lint can effect all sorts of troubles. A totally enclosed fan-cooled motor cannot be internally harmed by lint. However, in lint-laden atmospheres there is a tendency for the lint to accumulate into balls several inches in diameter that can be sucked into the ventilation openings of a motor. The ventilating system may also collect air-borne lint and become clogged.

An object of this invention is to provide an improved ventilating system for a dynamoelectric machine.

Another object of this invention is to provide an improved ventilating system for a totally enclosed dynamoelectric machine.

A further object of this invention is to provide an improved ventilating system for a totally enclosed dynamoelectric machine operating in an atmosphere heavily laden with fine and deformable foreign particles.

A still further object of this invention is to provide an improved ventilating system for a totally enclosed dynamoelectric machine with means to prevent air-borne foreign particles from clogging air passages in the ventilating system.

Other objects and advantages of the invention will be apparent from the following detailed description taken in connection with the accompanying drawings, in which:

Fig. 3 is a side elevational view partly in section of a dynamoelectric machine showing another embodiment of the invention.

Figure 1:
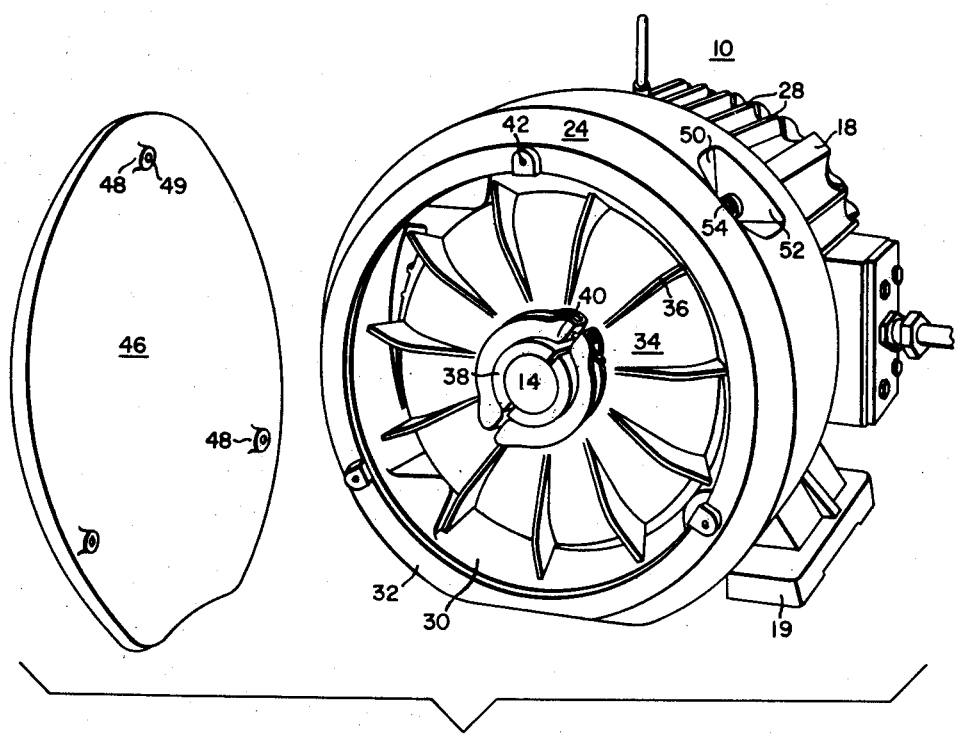
Fig. 1 is a perspective view of a dynamoelectric machine showing an embodiment of the present invention with the protective cover removed.

Referring now to the drawings, there is shown a dynamoelectric machine 10 having a rotor 12 mounted on a shaft 14. The rotor 12 is shown as being of the squirrel cage type including a plurality of laminations in which squirrel cage bars (not shown) are positioned in suitable slots and are connected by end rings 16. This machine has a generally tubular stator frame 18 in which is supported a laminated stator core 20 of any suitable or usual construction. Suitable stator windings 22 are placed in slots in the core 20 in the usual manner. One end enclosure 24 is secured to the tubular stator frame 18 in a manner to be hereinafter described. An end closure member of any suitable design may be secured to the other end of the frame in the usual manner or any suitable or desired manner. Closure member 24 carries a suitable bearing 26 for rotatably supporting the shaft 14. The stator frame 18 is formed with a plurality of heat radiating fins 28 which extend longitudinally with respect to the axis of the frame 18 and the shaft 14.

Figure 2:
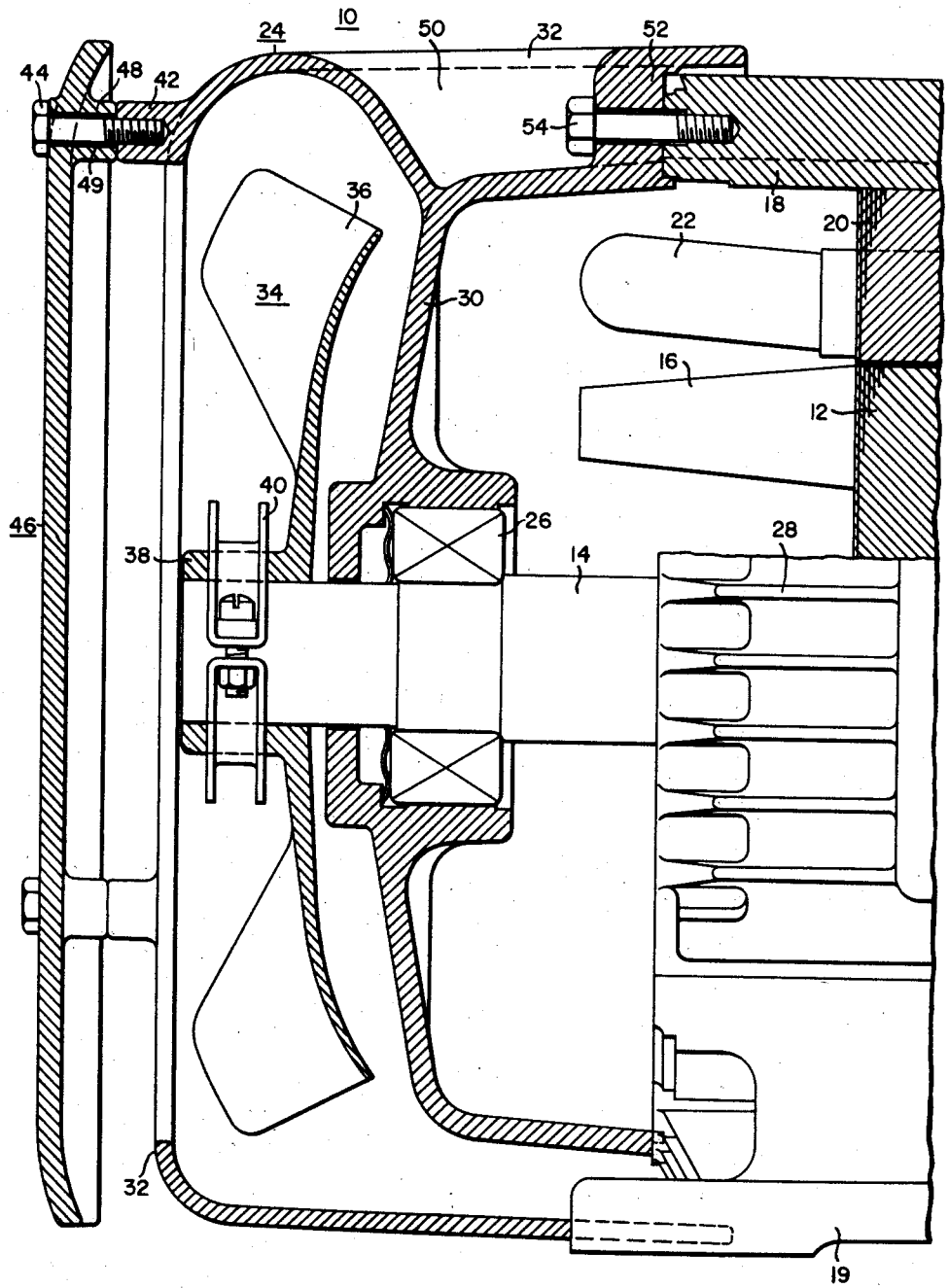
Fig. 2 is a side elevational view partly in section of the dynamoelectric machine of Fig. 1.

Referring to the embodiment shown in Figs. 1 and 2, closure member 24 includes an inner wall 30 and an annular outer wall 32 which forms a shroud. Inner wall 30 serves as the closure member for the frame and carries the bearing 26. Inner wall 30 has an opening through which the rotor shaft 14 extends. Secured to the free end of the rotor shaft is a fan 34 having blades 36 and a hub 38. The fan may be secured to the shaft in any suitable manner as, for example, by a divided strap 40 as herein shown. The exterior surfaces of the inner wall are smooth, streamlined and uninterrupted. The outer wall 32 is cast integral with inner wall 30 and extends rearwardly over a portion of the stator frame. It extends forwardly in the end of the inner wall 30 and over the fan blade 36. The interior surfaces of the outer wall are smooth and uninterrupted. Outer wall 32 has streamlined lugs 42 projecting forwardly. Lugs 42 are bored and threaded to receive a threaded screw 44. Outer wall 32 has a large central opening in its end portion to expose the fan 34 and to permit its placement on shaft 14 during assembly. A pie-shaped convex cover plate 46 having streamlined lugs 48 with openings 49 corresponding to the openings in lugs 42 is secured to the outer wall 32 by means of screws 44 passing through openings 49 and secured in the threaded openings of lugs 42. It can be seen that a substantial space is provided for passage of air due to the arrangements of lugs 42 and 48.

A plurality of circumferentially spaced recesses 50 are formed in the periphery of the outer wall 32. The recesses 50 provide a vertical rearwardly facing shoulder 52 on the closure member. Shoulder 52 abuts the end of the tubular frame. The end of the tubular frame has circumferentially spaced threads bored in the end thereof corresponding to each recess 50. A screw 54 passes through the rear shoulder of each recess 50 and into the threads of the tubular frame to secure the end closure to the frame 18. The tubular frame 18 may be provided with integrally cast feet 19 if desired.

It will be seen that we have provided by the foregoing construction a totally enclosed lint-free fan-cooled motor having a ventilating system that will not collect lint. This is accomplished by replacing the conventional shroud and bracket by a double wall bracket and a protective cover. The inner wall of the bracket forms the conventional means of supporting the bearing and enclosing the machine. The outer wall provides the shroud for the blower. This outer wall is integrally cast to the inner wall such that only streamlined surfaces are exposed to the air stream while mounting bolts are inserted from the outer surface. The outer wall is spaced radially outward from the adjoining bracket and frame surface so as to allow lint to pass through while at the same time the flow of air is kept close to the frame barrel for cooling. The outer wall is shaped around the fan to provide a shroud while the air entrance is made so as to admit the fan into the assembly. To eliminate the conventional protective grill or screen the air entrance is large and is without obstructions. Protection is provided by using a smooth piepan type cover spaced out in an axial direction from the shroud the proper distance by streamlined bosses. This allows free passage of lint-laden air and still provides protection from the revolving fan.

Another embodiment of the invention is shown in Fig. 3. The frame, rotor, stator and fan construction are identical with the previous embodiment. Only the end closure and the shroud are different. In this embodiment, an end closure or bracket 60 is provided with a separable shroud 62 and closure 60 is provided with circumferentially spaced radially extending lugs or bosses 64. The lugs 64 extend radially outward of the tubular frame 18 and abut the edge of the tubular frame. Circumferentially spaced about the edge of the frame 18 are spaced a plurality of tapped holes 66. Aligned with these holes 66 are apertures 68 in the lugs 64. The apertures 68 are counter-sunk on the side remote from the female threads. Socket head cap screws 70 are used to hold the bracket to the frame. The screws 70 are inserted through the aperture 68 into the holes 66 and the heads are recessed in the counterbores to furnish a smooth uninterrupted surface in the lugs. The outer wall 62 is radially spaced from the enclosure 60 to form a shroud which extends outwardly over and surrounding the fan. Projecting axially rearwardly from the shroud 62 are elongated portions 72 which rest on the free ends of the lugs 64. The elongated portions 72 may be secured to the lugs in any suitable manner such as by welding or by screws 74 as shown. Shroud 62 has forwardly projecting bosses 76 similar to the forwardly projecting bosses of the embodiment illustrated in Fig. 1. The protective cover of the Fig. 3 embodiment is identical to the protective cover of the embodiment illustrated in Figs. 1 and 2 and is secured to the shroud in a similar manner. In this design the connecting members (lugs 64) present a greatly reduced area to the lint-laden air stream. The shroud is held in place by elongations on its outer periphery. Thus the necessary supporting members now present little or no obstruction against which passage of lint-laden air can build up lint deposits. These lugs are further streamlined by using socket head cap screws and recessing the heads and counter bores in the lugs, to present a relatively smooth area to the air stream. Also, the streamlined lugs and the brackets are made so that they effectively deflect the air stream away from and around the sharp projections presented by a standard frame. It should now be apparent that a totally enclosed motor has been provided for operation in atmosphere heavily laden with lint and other foreign particles in which means have been provided for preventing clogging of the air ventilation system and in which an efficient and trouble-free ventilation system has been provided. Certain specific embodiments of the invention have been shown and are described for the purpose of illustration but it will be apparent that various modifications and other embodiments are possible within the scope of the invention. It is therefore to be understood that the invention is not limited to the specific arrangement shown but in its broadest aspect it includes all equivalent embodiments and applications which come within the scope of the invention.

We claim as our invention:

1. A totally enclosed fan-cooled dynamoelectric machine comprising a tubular frame having closure members at its ends to form a closed chamber, one of said closure members including an inner wall and an outer wall integral with said inner wall, said inner wall including a shaft receiving opening, a rotatable shaft received in said opening, a fan mounted on said shaft exteriorly of said inner wall, said outer wall spaced radially from said inner wall forming an annular shroud and having a central opening, large with respect to said shaft receiving opening, said inner wall having a smooth, uninterrupted exterior surface, said outer wall having a smooth, interior surface, imperforate cover means secured to said outer wall and spaced therefrom over central opening to shield said fan, said shroud portion of said outer wall having a plurality of circumferentially spaced recesses, a wall of each of said recesses abutting an edge of said tubular frame and means extending through said wall of said recess longitudinally into said tubular frame for securing said wall to said frame, whereby the surface exposed to the air stream is free from lint-catching obstructions.

2. A totally enclosed fan-cooled dynamoelectric machine comprising a tubular frame having closure members at its ends to form a closed chamber, one of said closure members including an inner wall and outer wall integral with said inner wall, said inner wall including a shaft receiving opening, a rotatable shaft received in said opening, a fan mounted on said shaft exteriorly of said inner wall, said outer wall spaced radially from said inner wall forming an annular shroud and having a central opening, large with respect to said shaft receiving opening, said inner wall having a smooth, exterior surface, said outer wall having a smooth, uninterrupted interior surface, said shroud portion of said outer wall having a plurality of circumferentially spaced recesses, a wall of each of said recesses abutting an edge of said tubular frame and means extending through said wall of said recess longitudinally into said frame for securing said wall to said frame, whereby the surface exposed to the air stream is free from lint-catching obstructions.

3. A totally enclosed fan-cooled dynamoelectric machine comprising a tubular frame having closure members at its ends to form a closed chamber, one of said closure members including an inner wall and an outer wall secured to said inner wall, said inner wall including a shaft opening, a rotatable shaft received in said opening, a fan mounted on said shaft exteriorly of said inner wall, said outer wall spaced radially from said inner wall forming an annular shroud and having a central opening, large with respect to said shaft receiving opening, said inner wall having a smooth, uninterrupted exterior surface, said outer wall having a smooth, uninterrupted interior surface, radially extending lugs circumferentially spaced on said inner wall, securing means extending longitudinally through said lugs and recessed therein and into said tubular frame for securing said wall to said frame, elongations on said outer wall extending toward said frame and means extending radially through said elongations and into said lugs for securing said elongations to said lugs, whereby the surface exposed to the air stream is free from lint-catching obstructions.

References Cited in the file of this patent

UNITED STATES PATENTS

| 1,958,213 | Smith | May 8, 1934 |
| 2,139,379 | Myers | Dec. 6, 1938 |
| 2,185,728 | Fechheimer | Jan. 2, 1940 |
| 2,202,622 | Brown | May 28, 1940 |
| 2,778,958 | Hamm | Jan. 22, 1957 |

FOREIGN PATENTS

| 1,104,671 | France | June 15, 1955 |